(12) United States Patent
Mundra

(10) Patent No.: US 12,073,006 B2
(45) Date of Patent: Aug. 27, 2024

(54) HARDWARE COUNTERMEASURES IN A FAULT TOLERANT SECURITY ARCHITECTURE

(71) Applicant: TEXAS INSTRUMENTS INCORPORATED, Dallas, TX (US)

(72) Inventor: Amritpal Singh Mundra, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 182 days.

(21) Appl. No.: 17/391,132

(22) Filed: Aug. 2, 2021

(65) Prior Publication Data

US 2021/0357536 A1 Nov. 18, 2021

Related U.S. Application Data

(63) Continuation of application No. 16/048,711, filed on Jul. 30, 2018, now Pat. No. 11,080,432.

(51) Int. Cl.
*G06F 21/75* (2013.01)
*G06F 21/85* (2013.01)
*H03K 17/22* (2006.01)
*H04L 9/00* (2022.01)

(52) U.S. Cl.
CPC ............ *G06F 21/755* (2017.08); *G06F 21/85* (2013.01); *H03K 17/223* (2013.01); *H04L 9/004* (2013.01)

(58) Field of Classification Search
CPC ..... G06F 21/755; G06F 21/85; H03K 17/223; H04L 9/004

USPC .......................................................... 726/34
See application file for complete search history.

(56) References Cited

U.S. PATENT DOCUMENTS

| | | | |
|---|---|---|---|
| 5,323,066 A | 6/1994 | Feddeler et al. | |
| 6,460,139 B1 | 10/2002 | Heinrich et al. | |
| 7,940,932 B2 | 5/2011 | Paksoy et al. | |
| 9,158,326 B1 | 10/2015 | Klein et al. | |
| 10,454,899 B1 * | 10/2019 | Gabrielson | H04L 9/3263 |
| 10,560,428 B2 | 2/2020 | Mundra et al. | |
| 10,572,619 B2 | 2/2020 | Levi et al. | |
| 2005/0210179 A1 | 9/2005 | Walmsley et al. | |
| 2006/0129848 A1 * | 6/2006 | Paksoy | G06F 21/35 713/193 |

(Continued)

FOREIGN PATENT DOCUMENTS

CN 101257490 A * 9/2008
CN 101873324 A * 10/2010

(Continued)

OTHER PUBLICATIONS

Kornaros et al., "Hardware Support for Cost-Effective System-Level Protection in Multi-core SoCs," 2015 Euromicro Conference on Digital System Design, Madeira, Portugal, 2015, pp. 41-48, doi: 10.1109/DSD.2015.65. (Year: 2015).*

(Continued)

*Primary Examiner* — Peter C Shaw
(74) *Attorney, Agent, or Firm* — Michael T. Gabrik; Frank D. Cimino

(57) ABSTRACT

A system-on-chip (SoC) is provided that includes security control registers, the security control registers including security flags for security critical assets of the SoC, wherein each security flag includes multiple bits.

17 Claims, 3 Drawing Sheets

(56) References Cited

U.S. PATENT DOCUMENTS

| | | | | |
|---|---|---|---|---|
| 2006/0168414 A1* | 7/2006 | Nobunaga | ............... | G11C 16/22 |
| | | | | 711/163 |
| 2006/0279439 A1* | 12/2006 | Swoboda | ................ | H04L 12/66 |
| | | | | 341/60 |
| 2007/0011419 A1* | 1/2007 | Conti | ................. | G06F 12/1458 |
| | | | | 711/163 |
| 2007/0180173 A1* | 8/2007 | Jin | ...................... | G06F 13/4221 |
| | | | | 710/33 |
| 2007/0226795 A1* | 9/2007 | Conti | .................... | G06F 21/554 |
| | | | | 726/22 |
| 2009/0055612 A1 | 2/2009 | Sibert | | |
| 2010/0017893 A1 | 1/2010 | Foley et al. | | |
| 2013/0298221 A1* | 11/2013 | Smith | ................. | H04L 63/0414 |
| | | | | 726/13 |
| 2014/0223568 A1 | 8/2014 | Boehl | | |
| 2014/0298459 A1 | 10/2014 | Lewis et al. | | |
| 2016/0028728 A1* | 1/2016 | Hampel | ................ | H04L 9/3234 |
| | | | | 713/181 |
| 2016/0056842 A1* | 2/2016 | Linstadt | .............. | G06F 11/1004 |
| | | | | 714/776 |
| 2016/0077904 A1* | 3/2016 | Wendel | ............... | G06F 11/0772 |
| | | | | 714/819 |
| 2016/0146888 A1 | 5/2016 | Vooka et al. | | |
| 2018/0260280 A1* | 9/2018 | Traykov | .............. | G06F 11/1438 |

FOREIGN PATENT DOCUMENTS

| | | | | | |
|---|---|---|---|---|---|
| CN | | 112640474 A | * | 4/2021 | ....... H04N 21/23892 |
| WO | WO-2015113046 A1 | * | 7/2015 | ............. G06F 21/44 |

OTHER PUBLICATIONS

Grammatikakis et al., "Security in MPSoCs: A NoC Firewall and an Evaluation Framework," in IEEE Transactions on Computer-Aided Design of Integrated Circuits and Systems, vol. 34, No. 8, pp. 1344-1357, Aug. 2015, doi: 10.1109/TCAD.2015.2448684. (Year: 2015).*

Liubavin et al., "Design of a Fully-Autonomous Low-Power AXI4 Firewall for PCI-Express NVMe SSD," 2022 Conference of Russian Young Researchers in Electrical and Electronic Engineering (ElConRus), Saint Petersburg, Russian Federation, 2022, pp. 166-169, doi: 10.1109/ElConRus54750.2022.9755734. (Year: 2022).*

Grammatikakis et al., "High-level security services based on a hardware NoC Firewall module," 2015 12th International Workshop on Intelligent Solutions in Embedded Systems (WISES), Ancona, Italy, 2015, pp. 73-78. (Year: 2015).*

Grammatikakis et al., "Security Effectiveness and a Hardware Firewall for MPSoCs," IEEE, Paris, France, 2014, pp. 1032-1039, doi: 10.1109/HPCC.2014.173. (Year: 2014).*

Kayssi et al., "FPGA-based Internet protocol firewall chip," ICECS 2000. 7th IEEE International Conference on Electronics, Circuits and Systems (Cat. No. 00EX445), Jounieh, Lebanon, 2000, pp. 316-319 vol. 1, doi: 10.1109/ICECS.2000.911545. (Year: 2000).*

Dolev et al., "Error correction based on hamming distance preserving in arithmetical and logical operations," 2012 IEEE 27th Convention of Electrical and Electronics Engineers in Israel, Eilat, Israel, 2012, pp. 1-5, doi: 10.1109/EEEI.2012.6376946. (Year: 2012).*

Suntiamorntut, "Hamming Distance and Normalization Circuits," 2007 International Conference on Communications, Circuits and Systems, Kokura, Japan, 2007, pp. 1053-1056, doi: 10.1109/ICCCAS.2007.4348227. (Year: 2007).*

Chen et al., "Hamming Distance Computation in Unreliable Resistive Memory," in IEEE Transactions on Communications, vol. 66, No. 11, pp. 5013-5027, Nov. 2018, doi: 10.1109/TCOMM.2018.2840717. (Year: 2018).*

Bilgiday Yuce et al, "FAME: Fault-attack Aware Microprocessor Extensions for Hardware Fault Detection and Software Fault Response", Proceedings of the Hardware and Architectural Support for Security and Privacy 2016, Article No. 8, Seoul, Republic of Korea, Jun. 18, 2016, pp. 1-8.

Amrit Mundra, "Embedded Processor Security What's at stake? Where to start?", SPRY303A, Texas Instruments, Inc., Oct. 2016, pp. 1-9.

Amrit Mundra and Hong Guan, "Secure Boot on Embedded Sitara Processors", SPRY305, Texas Instruments, Inc., 2017, pp. 1-7.

Amrit Mundra, "Where to Start with Embedded Processor Security", EECatalog, Jul. 17, 2017, pp. 1-6.

* cited by examiner

HARDWARE COUNTERMEASURES IN A FAULT TOLERANT SECURITY ARCHITECTURE

CROSS-REFERENCE TO RELATED APPLICATIONS

This application is a continuation of U.S. patent application Ser. No. 16/048,711, filed Jul. 30, 2018, which is incorporated by reference herein in its entirety.

BACKGROUND

The integrity and trustworthiness of embedded devices in industrial and automotive applications is critical as disruptions in operation may have direct security consequences. Fault attacks are employed to attempt to compromise such devices. A fault attack is some form of intentional manipulation of an embedded device with the goal of causing an error that puts the device in an unintended, vulnerable state that, for example, allows access to security critical information or disables internal protection mechanisms. Types of fault attacks include clock fault injection, voltage fault injection, electromagnetic fault injection, and optical fault injection.

SUMMARY

Examples of the present disclosure relate to methods and apparatus for hardware countermeasures in a fault tolerant security architecture. In one aspect, a system-on-chip (SoC) is provided that includes security control registers, the security control registers including security flags for security critical assets of the SoC, wherein each security flag includes multiple bits.

In one aspect, a method of operating a system-on-chip (SoC) is provided that includes receiving a power on reset (POR) signal in the SoC, reading values of security flags for security critical assets of the SoC from configuration storage of the SoC responsive to the POR signal, and storing the values of the security flags in security control registers comprised in the SoC, wherein each security flag value comprises multiple bits.

DETAILED DESCRIPTION

Figure 1:
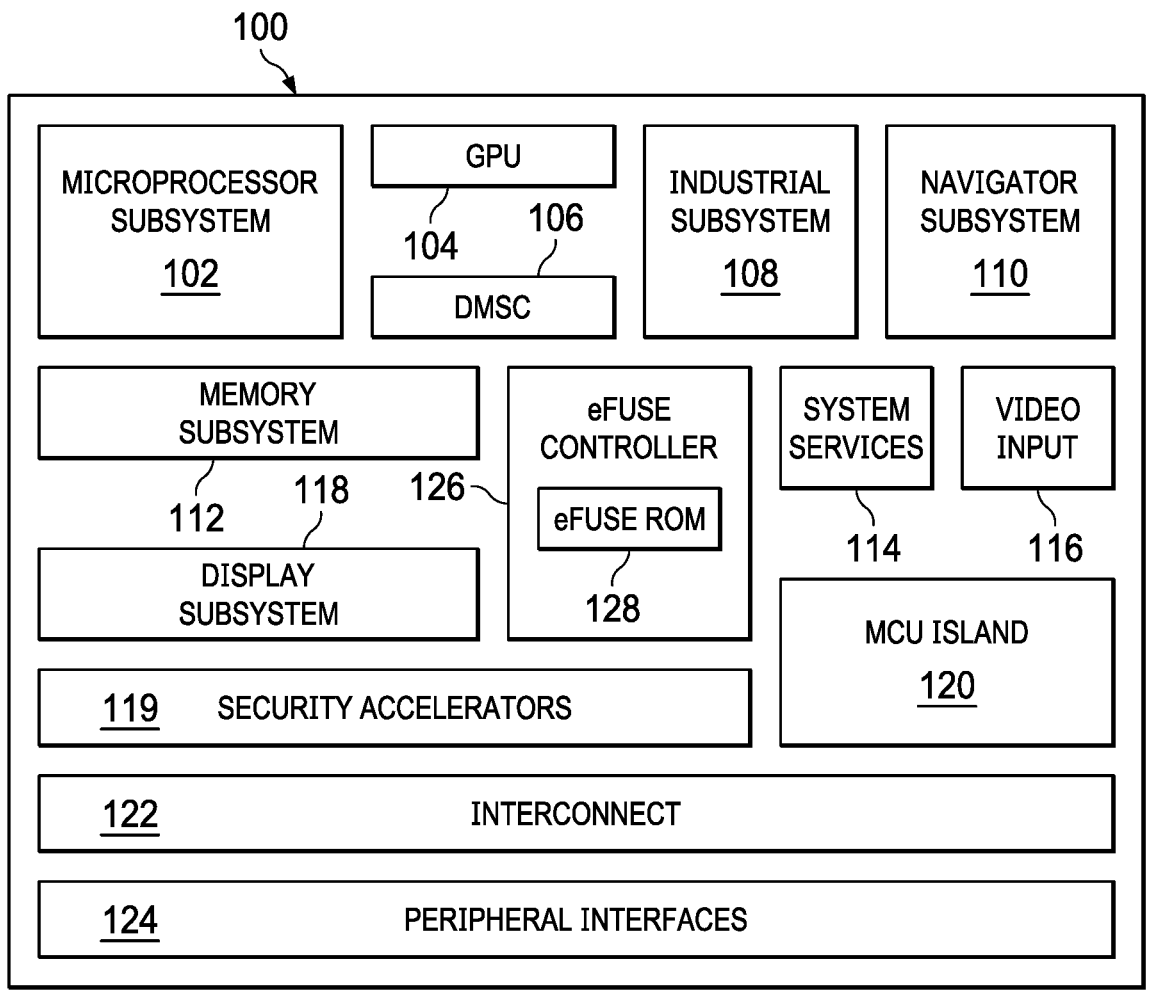
FIG. 1 is a block diagram of an example system-on-chip (SoC) incorporating a fault tolerant security architecture.

Specific examples of the disclosure will now be described in detail with reference to the accompanying figures. Like elements in the various figures are denoted by like reference numerals for consistency.

FIG. 1 is a block diagram of an example system-on-chip (SoC) 100 incorporating a fault tolerant security architecture with various hardware implemented countermeasures against fault attacks. The SoC 100 includes a microprocessor subsystem 102 with multiple processing cores and shared memory, a graphics processing unit (GPU) 104, an industrial subsystem 108 providing industrial communication interfaces, and a navigator subsystem 110 with direct memory access and queue management components. The SoC 100 further includes a memory subsystem 112, system services 114 including timers and peripheral direct memory access, a video input 116 subsystem including camera and video input interfaces, and a display subsystem 118 including overlay management and display interfaces. In addition, the SoC 100 includes security accelerators 119 supporting various encryption standards, a microcontroller (MCU) island 120 including an MCU subsystem with separate voltages, clocks, and peripherals, and peripheral interfaces 124 including, for example, automotive interfaces, control interfaces, Ethernet, universal serial bus (USB), and general purpose input/output (GPIO). A high-speed interconnect 122 provides a bus architecture between the various components of the SoC 100.

The SoC 100 further includes an eFuse controller 126 which includes an eFuse ROM 128, e.g., configuration storage. The eFuse ROM 128 is a bank of fuses arranged in an array of rows and columns that may be used to store security keys and various boot configuration values, including configuration values such as the device type and security flag values for the fault tolerant security architecture. The eFuse controller 126 is configured to scan the array during a power-on reset (POR) of the SoC 100 to determine which eFuses are open and which are closed, convert that information into a binary 0 or 1, and provide the binary information to relevant components of the SoC 100.

System memories and peripheral interfaces in the SoC 100 are protected by hardware firewall modules. Further, initiator side control (ISC) modules are coupled to transaction initiation components in the SoC 100 to apply security attributes to initiated transactions. The ISC modules ensure that transactions are assigned source identifiers and access privileges such that a firewall module interfaced to a target component can use this information to permit the target component to carry out selective processing based on the source and access privileges. In some examples, the SoC 100 implements a firewall/ISC architecture as described in U.S. patent application Ser. No. 15/679,307, entitled "Flexible Hybrid Firewall Architecture, filed Aug. 17, 2017, which is incorporated by reference herein.

Figure 2:
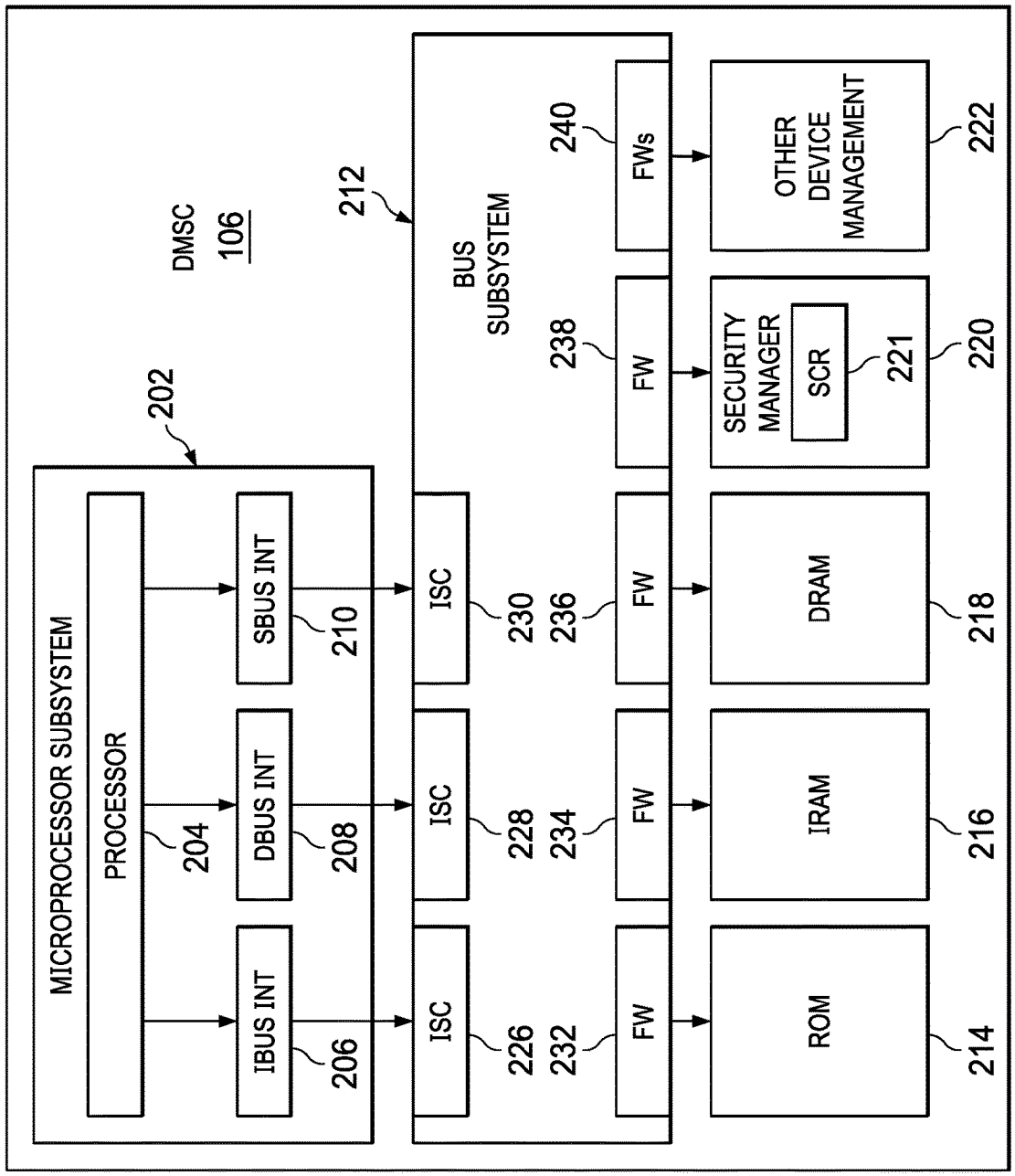
FIG. 2 is a simplified block diagram of a device management security controller (DMSC) of the SoC of FIG. 1.

The SoC 100 further includes a device management security controller (DMSC) 106 configured to manage system services including initial boot, security, safety, and power management. FIG. 2 is a simplified block diagram of an example DMSC 106. The DMSC 106 includes a microprocessor subsystem 202 incorporating a processor 204, e.g., an ARM Cortex-M3, coupled to on-chip read-only memory (ROM) 214, on-chip instruction random access memory (IRAM) 216, on-chip data RAM (DRAM) 218, and other DMSC 106 components 220, 222 via a bus subsystem 212. The instruction bus, data bus, and system bus of the processor 204 are coupled to the bus subsystem 212 via respective bus interfaces 206, 208, 210. The on-chip read-only memory (ROM) 214 stores boot code that allows the DMSC 106 to autonomously boot and configure the rest of the SoC 100 to facilitate full device boot.

The bus subsystem 212 includes a firewall architecture for the DMSC 106. Initiator side control (ISC) modules 226, 228, 230 implemented in the bus subsystem 212 control security attributes applied to transactions initiated by the processor 204 via the bus interfaces 206, 208, 210. Further, firewall (FW) modules 232, 234, 236, 238, 240 implemented in the bus subsystem 212 control access to respective protected components of the DMSC 106, i.e., the memories 214, 216, 218, the security manager 220, and other device management components 222.

Other device management components 222 include components for power management, interrupt aggregation, memory fault detection and correction, debug authorization, configuration of the SoC 100 firewall modules, timer management, and an encryption engine. Access to each of the components 222 is controlled by a respective FW of the FWs 240.

The DMSC 106 acts as the security master of the SoC 100, controlling the initial security configuration at boot time and controlling the security critical assets of the SoC 100 during run time. Security configurations of security critical assets such as emulation control, debugging, ISC modules, and firewall modules are performed by the DMSC 106. The security manager 220 incorporates much of the security management functionality of the DMSC 106 including SoC 100 security management, device type control, emulation control, debug control, and key management.

The security manager 220 is one of the initial blocks enabled at a power on reset (POR) of the SoC 100 in order to configure the security settings of the SoC 100 prior to bringing the rest of the SoC 100 out of reset. As an initial action, the security manager 220 decodes a device type of the SoC 100, e.g., test, emulator, high security, or general purpose, received from the eFuse ROM 128. Each device type indicates different capabilities for test, debug, and emulation as well as different behavior in operating mode, thus indicating whether security mechanisms should be relaxed or enforced. The security manager 220 determines the security level based on the device type and changes values in security control registers 221 accordingly.

A hardware countermeasure is employed to protect the device type information supplied to the security manager 220 because the device type is read from the eFuse ROM 128 in a different voltage domain from that of the security manager 220. A voltage crossing between domains operating at different voltages can cause signal corruption. In general, the hardware countermeasure involves including a set of validation bits when signaling a set of security critical bits. In some examples, the value of the set of validation bits is the inverse of the value of the security critical bits. The recipient of the security critical bits and the validation bits can use the validation bits to confirm that the security critical bits are valid before relying on the security critical bits.

In one example embodiment, the device type is signaled as a 16-bit value of two sets of eight bits that are bit-wise-inverse of each other. That is, eight security critical bits in the 16-bit value include the actual device type and the other eight bits are validation bits that are the inverse of the eight security critical bits. The security manager 220 verifies that no corruption has occurred during transfer as part of determining the device type as illustrated in the example pseudo code of Table 1. In this pseudo code, device_type_raw is the 16-bit value received from the eFuse ROM 128.

TABLE 1

```
If (device_type_raw [7:0] != (~(device_type_raw[15:8])))
begin
    device_type = BAD;
end
else
begin
    decode device type;
end
```

The security manager 220 outputs various security control signals to security critical hardware assets based on the values of security flags initially configured by values read from the eFuse ROM 128. The security flags are stored in security control registers 221 protected by the firewall module 228 corresponding to the security manager 220. In some examples, the security control registers 221 are memory mapped registers. Further, some of the registers 221 storing configured security flags can be locked until the next power cycle of the SoC 100 by setting security flags referred to as lock flags in the registers. Note that the combination of firewall protection and register locking provides two levels of protection for security critical assets.

To help protect security critical hardware assets, e.g., a debug port or a firewall module, from fault attacks that rely on flipping a single bit, security flags for such hardware assets are specified, stored, and output as multi-bit values rather than single bit values. Any suitable number of bits and any suitable values for the multiple bits that provide protection against fault attacks may be used. In some examples, four-bit values are used, where bit values that are equal Hamming distance away from each other, e.g., 1010, indicate access is enabled and any other value indicates that access is not enabled. Further, lock values are similarly multi-bit values.

Tables 2-6 are examples of register layouts in the security manager 220 utilizing these multi-bit values. Table 2 is a register controlling firewall bypass that includes a 4-bit lock flag and 4-bit flags controlling bypassing the DMSC 106 firewall modules and bypassing the SoC 100 firewall modules. Table 3 is a register providing master control of tracing, emulation, and debugging of the SoC 100 that includes 4-bit flags for enabling or disabling each. Tables 4-6 are registers controlling access to a key encryption key (KEK), also referred to as the random key, a master public key (MPK), and a master encryption key (MEK), respectively. Each register includes a 4-bit lock flag and 4-bit flags controlling access to the respective key.

TABLE 2

| Bits | Field | Type | Reset [updated after eFuse scan] | Description |
| --- | --- | --- | --- | --- |
| 31:28 | Reserved | r/o | 0 | Reserved |
| 27:24 | Lock Register | r/w | 0xA | Unlock code is 0xA, if value is anything else the register locks, once locked this register cannot be changed till POR. |

TABLE 2-continued

| Bits | Field | Type | Reset [updated after eFuse scan] | Description |
|---|---|---|---|---|
| 23:12 | Reserved | r/o | 0 | Reserved |
| 11:8 | DMSC Firewall Bypass | r/w | EMULATOR (Sub type) = Closed (0x0)<br>HIGH_SECURITY = Closed (0x0)<br>GENERAL_PURPOSE = Bypass (0xA)<br>TEST = Bypass (0xA)<br>BAD = Closed (0x0) | Writing code 0xA will put DMSC firewall in bypass mode. |
| 7:4 | Reserved | r/o | 0 | Reserved |
| 3:0 | SoC Firewall Bypass | r/w | EMULATOR = Closed (0x0)<br>HIGH_SECURITY = Closed (0x0)<br>GENERAL_PURPOSE = Bypass (0xA)<br>TEST = Bypass (0xA)<br>BAD = Closed (0x0) | Writing code 0xA will put all SoC firewalls in bypass mode, excluding DMSC. |

TABLE 3

| Bits | Field | Type | Reset | Description |
|---|---|---|---|---|
| 31:20 | Reserved | r/o | 0 | Reserved |
| 19:16 | soc_trace_enable | r/w | EMULATOR = Enabled (0xA)<br>HIGH_SECURITY = Closed (0x0)<br>GENERAL_PURPOSE = Enabled (0xA)<br>TEST = Enabled (0xA)<br>BAD = Closed (0x0) | Writing code 0xA will allow trace for entire SoC. |
| 15:12 | Reserved | r/o | 0 | Reserved |
| 11:8 | sec_emu_enable | r/w | EMULATOR = Enabled (0xA)<br>EMULATOR = Enabled (0xA)<br>HIGH_SECURITY = Closed (0x0)<br>GENERAL_PURPOSE = Enabled (0xA)<br>TEST = Enabled (0xA)<br>BAD = Closed (0x0) | Writing code 0xA will allow secure emulation for All SoC. |
| 7:4 | Reserved | r/o | 0 | Reserved |
| 3:0 | sec_debug_enable | r/w | EMULATOR = Enabled (0xA)<br>HIGH_SECURITY = Closed (0x0)<br>GENERAL_PURPOSE = Enabled (0xA)<br>TEST = Enabled (0xA)<br>BAD = Closed (0x0) | Writing code 0xA will enable full debug for SoC except DMSC. |

TABLE 4

| Bits | Field | Type | Reset | Description |
|---|---|---|---|---|
| 31:28 | Reserved | r/o | 0 | Reserved |
| 27:24 | Lock Config | r/w | 0xA | Unlock code is 0xA, if value is anything else the register locks, once locked this register cannot be changed till POR. |
| 23:20 | Reserved | r/o | 0 | Reserved |
| 19:16 | KEK Override control | r/w | 0x0 | 0xA Override KEK output to value from KEK override registers.<br>Else: KEK is as coming from KEK eFuses |
| 15:12 | Reserved | r/o | 0 | Reserved |
| 11:8 | SW KEK Write Access | r/w | 0xA | 0xA Write Access allowed to SW KEK register<br>Else: No write access |
| 7:4 | Reserved | r/o | 0 | Reserved |
| 3:0 | SW KEK Read Access | r/w | 0xA | 0xA Read Access allowed to SW KEK register<br>Else: No Read access. |

TABLE 5

| Bits | Field | Type | Reset | Description |
|---|---|---|---|---|
| 31:28 | Reserved | r/o | 0 | Reserved |
| 27:24 | Lock Config | r/w | 0xA | Unlock code is 0xA, if value is anything else the register locks, once locked this register cannot be changed till POR. |

TABLE 5-continued

| Bits | Field | Type | Reset | Description |
|---|---|---|---|---|
| 23:20 | Reserved | r/o | 0 | Reserved |
| 19:16 | Echo MPK in status register | r/w | 0 | Writing code 0xA will echo MPK value in MPK read only Status registers |
| 15:12 | Reserved | r/o | 0 | Reserved |
| 11:8 | MPK Write Access | r/w | 0xA | 0xA Write Access allowed Else: No write access |
| 7:4 | Reserved | r/o | 0 | Reserved |
| 3:0 | MPK Read Access | r/w | 0xA | 0xA Read Access allowed Else: No Read access. |

TABLE 6

| Bits | Field | Type | Reset | Description |
|---|---|---|---|---|
| 31:28 | Reserved | r/o | 0 | Reserved |
| 27:24 | Lock Config | r/w | 0xA | Unlock code is 0xA, otherwise register is locked until next POR |
| 23:20 | Reserved | r/o | 0 | Reserved |
| 19:16 | Echo MEK index value in status register | r/w | 0 | Writing code 0xA will echo MEK index value in status register |
| 15:12 | Reserved | r/o | 0 | Reserved |
| 11:8 | MEK Write Access | r/w | 0xA | 0xA Write Access allowed Else: No write access |
| 7:4 | Reserved | r/o | 0 | Reserved |
| 3:0 | MEK Read Access | r/w | 0xA | 0xA Read Access allowed Else: No Read access. |

The security manager 220 also provides for optional security flags that can be accessed by software executed from the ROM 214. Similar to the security flags for security critical hardware assets, the optional security flags are specified, stored, and output as multi-bit values rather than single bit values too help protect these flags from fault attacks that rely on flipping a single bit. Any number of optional security flags can be provided. Any suitable number of bits and any suitable values for the multiple bits may be used. In some examples, four-bit values are used, where bit values that are equal Hamming distance away from each other, e.g., 1010, indicate the ROM-defined option associated with the flag is enabled and any other value indicates that the option is not enabled.

Table 8 is an example of a register in the security manager 220 that allows for enabling or disabling eight optional security flags. The values of these flags and usage of these flags can determined by the system designer and the values stored in the eFuse ROM 128. The initial values of these register fields are set by the security manager 220 during eFuse scanning at POR.

TABLE 8

| Bits | Field | Type | Reset | Description |
|---|---|---|---|---|
| [31:28] | Fault tolerant ROM eFuse option7 | r/w | 0 | If the value is 0xA, then option is enabled. Else: Selected option is disabled. |
| [27:24] | Fault tolerant ROM eFuse option6 | r/w | 0 | If the value is 0xA, then option is enabled. Else: Selected option is disabled. |
| [23:20] | Fault tolerant ROM eFuse option5 | r/w | 0 | If the value is 0xA, then option is enabled. Else: Selected option is disabled. |
| [19:16] | Fault tolerant ROM eFuse option4 | r/w | 0 | If the value is 0xA, then option is enabled. Else: Selected option is disabled. |
| [15:12] | Fault tolerant ROM eFuse option3 | r/w | 0 | If the value is 0xA, then option is enabled. Else: Selected option is disabled. |
| [11:8] | Fault tolerant ROM eFuse option2 | r/w | 0 | If the value is 0xA, then option is enabled. Else: Selected option is disabled. |

TABLE 8-continued

| Bits | Field | Type | Reset | Description |
| --- | --- | --- | --- | --- |
| [7:4] | Fault tolerant ROM eFuse option1 | r/w | 0 | If the value is 0xA, then option is enabled. Else: Selected option is disabled. |
| [3:0] | Fault tolerant ROM eFuse option0 | r/w | 0 | If the value is 0xA, then option is enabled. Else: Selected option is disabled. |

Figure 3:
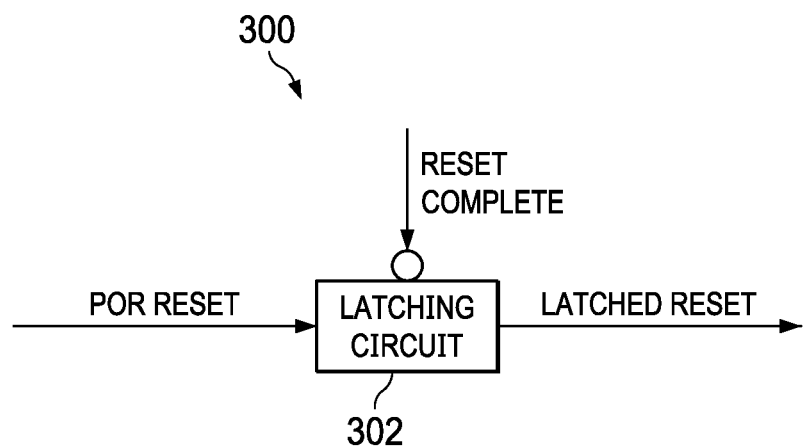
FIG. 3 is a block diagram of reset circuitry of the SoC of FIG. 1.

FIG. 3 is a simplified block diagram of reset circuitry 300 of the SoC 100 providing a countermeasure for fault attacks via POR. POR of a device takes some time to complete, and, once the reset signal is asserted, the signal must be asserted along enough for the reset indication to reach all modules to be reset. One possible fault attack is to assert the reset signal and then de-assert it such that the signal is not kept alive as long as expected. Such an attack can leave some modules in a vulnerable state. For example, a critical module such as a debug module can be left in a state that allows access to the device.

The reset circuitry 300 is designed to remove this sensitivity to premature de-assertion of the reset signal from the POR process. Rather than relying on propagation of the external reset signal to internal modules, the external reset signal is latched by the latching circuitry 302 and the resulting latched reset signal is propagated to the internal modules. The latching circuitry 302 can be, for example, a latch or a set/reset (SR) flip-flop. The latching circuitry 302 clears the latch only when a reset complete signal is received indicating that the POR processing is complete. Any de-assertion or re-assertion of the external POR signal is ignored until the POR processing by the SoC modules is completed and the latching circuitry 302 clears the latch.

Figure 4:
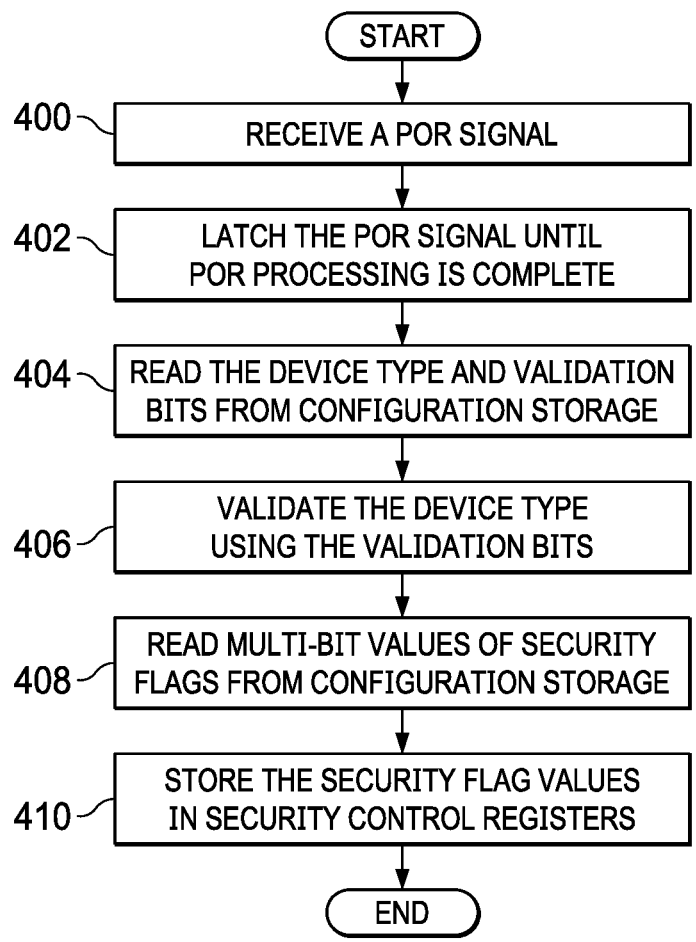
FIG. 4 is a flow diagram of a method for operating the SoC of FIG. 1.

FIG. 4 is a flow diagram of a method for operating the SoC of FIG. 1. Initially, a POR signal is received 400 in the SoC and the POR is latched 402 by the reset circuitry 300 until POR processing is complete. The bits encoding the device type and the validation bits are read 404 from configuration storage, e.g., scanned from the eFuse ROM 128, and the device type is validated 406 by the security manager 220 using the validation bits. Multi-bit values of security flags are read 408 from configuration storage, e.g., scanned from the eFuse ROM 128, and stored 410 in security control registers by the security manager 220.

OTHER EXAMPLES

While the disclosure has been described with respect to a limited number of examples, those having benefit of this disclosure will appreciate that other examples can be devised which do not depart from the scope of the disclosure as described herein.

For example, the multi-bit values of the security control flags and/or the number of bits in a security control flag can differ from among the flags.

It is therefore contemplated that the appended claims will cover any such modifications of the examples as fall within the true scope of the disclosure.

What is claimed is:

1. A system comprising:
a processor;
a bus subsystem coupled to the processor that includes a set of firewalls each configured to couple the processor to a respective device of a set of devices; and
a security manager coupled to the bus subsystem that includes a set of security control registers, wherein:
the set of security control registers includes a first subset configured to store a first value; and
the security manager is configured to determine whether to cause a first firewall to operate in a bypass mode based on whether bit values of the first value satisfy a specific criterion with respect to each other, wherein the specific criterion is that the bit values of the first value are an equal Hamming distance away from each other.

2. The system of claim 1, wherein the first subset of the set of security control registers includes a plurality of bits that collectively determine the first value.

3. A system comprising:
a processor;
a bus subsystem coupled to the processor that includes a set of firewalls each configured to couple the processor to a respective device of a set of devices; and
a security manager coupled to the bus subsystem that includes a set of security control registers, wherein:
the set of security control registers includes a first subset configured to store a first value;
the set of security control registers includes a second subset configured to store a second value;
the security manager is configured to determine whether to cause a first firewall to operate in a bypass mode based on the first value; and
the security manager is configured to determine whether to lock the first subset and the second subset of the set of security control registers based on the second value.

4. The system of claim 3, wherein the security manager is configured to, when the second value indicates to lock the first subset and the second subset, prohibit a change to either the first value or the second value until after a power-on-reset event.

5. The system of claim 3, wherein the security manager is configured to determine whether to lock the first subset and the second subset of the set of security control registers based on whether bit values of the second value are an equal Hamming distance away from each other.

6. The system of claim 3, wherein the security manager is configured to determine whether to lock the first subset and the second subset of the set of security control registers based on whether each bit value of the second value is an inverse of each adjacent bit.

7. The system of claim 1, wherein the security manager is configured to:
receive a second value to store in the set of security control registers and a set of validation bits;
verify the second value based on the set of validation bits; and
determine whether to store the second value in the set of security control registers based on the verification of the second value based on the set of validation bits.

8. The system of claim 7, wherein the security manager is configured to verify the second value by determining whether the set of validation bits is a bit-wise-inverse of the second value.

9. The system of claim 1, wherein: the set of security control registers includes a second subset configured to store a second value; and
the security manager is configured to determine whether to cause a second firewall to operate in a bypass mode based on the second value.

10. The system of claim 1, wherein the first firewall is coupled between the processor and the security manager.

11. The system of claim 1, wherein: the set of devices includes a memory; and the first firewall is coupled between the processor and the memory.

12. A system comprising:
a processor;
a bus subsystem coupled to the processor that includes a set of firewalls each configured to couple the processor to a respective device of a set of devices; and
a security manager coupled to the bus subsystem that includes a set of security control registers, wherein:
the set of security control registers includes a first subset configured to store a first value;
the set of security control registers includes a second subset configured to store a second value;
the security manager is configured to determine whether to cause a first firewall to operate in a bypass mode based on the first value; and
the security manager is configured to determine whether to permit, based on the second value, a function from a group consisting of: a trace function, an emulation function, and a debug function.

13. A system-on-a-chip comprising:
a processor;
a bus subsystem coupled to the processor that includes a first firewall and a second firewall;
a memory coupled to the first firewall; and
a security manager coupled to the second firewall, wherein:
the security manager includes a set of security control registers that includes a first set of bits configured to store a first value and a second set of bits configured to store a second value;
the security manager is configured to cause the first firewall to operate in a bypass mode based on the first value; and
the security manager is configured to lock the first set of bits based on the second set of bits satisfying a specific criterion, wherein the specific criterion is that the bit values of the second value are an equal Hamming distance away from each other.

14. The system-on-a-chip of claim 13, wherein the first set of bits collectively determine the first value.

15. The system-on-a-chip of claim 13, wherein the security manager is configured to, in locking the first set of bits, prohibit a change to the first value until after a power-on-reset event.

16. The system-on-a-chip of claim 13, wherein the specific criterion further includes that each bit of the second set of bits is an inverse of each adjacent bit.

17. A system-on-a-chip comprising:
a processor;
a bus subsystem coupled to the processor that includes a first firewall and a second firewall;
a memory coupled to the first firewall; and
a security manager coupled to the second firewall, wherein:
the security manager includes a set of security control registers that includes a first set of bits configured to store a first value;
the security manager is configured to cause the first firewall to operate in a bypass mode based on the first value; and
the security manager is configured to cause the first firewall to operate in the bypass mode based on bit values of the first value being an equal Hamming distance away from each other.

* * * * *